United States Patent
Dunn et al.

(10) Patent No.: US 10,289,326 B2
(45) Date of Patent: May 14, 2019

(54) OPTIMIZED DATA LAYOUT FOR OBJECT STORE SYSTEM

(71) Applicant: HGST Netherlands B.V., Amsterdam (NL)

(72) Inventors: Paul Frederick Dunn, Colorado Springs, CO (US); Randall Lee Hess, Colorado Springs, CO (US)

(73) Assignee: HGST Netherlands, B.V., Amsterdam (NL)

( * ) Notice: Subject to any disclaimer, the term of this patent is extended or adjusted under 35 U.S.C. 154(b) by 0 days.

(21) Appl. No.: 14/853,741

(22) Filed: Sep. 14, 2015

(65) Prior Publication Data

US 2017/0075609 A1    Mar. 16, 2017

(51) Int. Cl.
G06F 12/00 (2006.01)
G06F 3/06 (2006.01)

(52) U.S. Cl.
CPC ............ *G06F 3/0625* (2013.01); *G06F 3/064* (2013.01); *G06F 3/0683* (2013.01); *G06F 12/00* (2013.01); *Y02D 10/154* (2018.01)

(58) Field of Classification Search
CPC ....................................................... G06F 12/00
USPC ......................................................... 711/114
See application file for complete search history.

(56) References Cited

U.S. PATENT DOCUMENTS

| | | |
|---|---|---|
| 6,400,892 B1 | 6/2002 | Smith |
| 7,472,298 B1 * | 12/2008 | Kimmel ................ G06F 1/3203 |
| | | 713/320 |
| 7,516,348 B1 | 4/2009 | Ofer |
| 7,685,463 B1 | 3/2010 | Linnell |
| 8,006,111 B1 | 8/2011 | Faibish et al. |
| 8,296,513 B1 | 10/2012 | Liu |
| 8,745,327 B1 | 6/2014 | Throop et al. |
| 2002/0144057 A1 | 10/2002 | Li et al. |
| 2005/0204097 A1 | 9/2005 | Kistler et al. |
| 2005/0235109 A1 | 10/2005 | Ogihara et al. |
| 2006/0036605 A1 | 2/2006 | Powell et al. |
| 2006/0069886 A1 * | 3/2006 | Tulyani ................. G06F 3/0605 |
| | | 711/161 |
| 2006/0107099 A1 | 5/2006 | Pinheiro et al. |
| 2009/0112894 A1 | 4/2009 | Idel et al. |
| 2009/0235097 A1 | 9/2009 | Hamilton et al. |

(Continued)

OTHER PUBLICATIONS

Cidon, et al., Copysets: Reducing the Frequency of Data Loss in Cloud Storage, Standford University, dated 2013, 12 pages.

(Continued)

*Primary Examiner* — Gautam Sain
(74) *Attorney, Agent, or Firm* — Patent Law Works LLP

(57) ABSTRACT

The present disclosure relates to systems and methods of an optimized data layout in an erasure coded storage system. The system may be realized as a deterministic layout of storage devices in an erasure coded storage system. The system implements a method for writing pieces of a data object across storage devices of a specified write set included an erasure coded storage subsystem. The system further implements a method for reading a subset of pieces of a data object from an active read subset of storage devices in a read set included in the erasure coded storage subsystem and restoring the data object from the subset of pieces. The system may further include operating an inactive read subset of storage devices in a read set in a low power mode.

20 Claims, 7 Drawing Sheets

(56) References Cited

U.S. PATENT DOCUMENTS

| | | |
|---|---|---|
| 2010/0238574 A1 | 9/2010 | Balasubramaniam |
| 2010/0287397 A1 | 11/2010 | Naor et al. |
| 2010/0313044 A1 | 12/2010 | Rajpal et al. |
| 2010/0313045 A1 | 12/2010 | Olarig et al. |
| 2011/0035547 A1 | 2/2011 | Kidney et al. |
| 2011/0035565 A1 | 2/2011 | Barrall |
| 2011/0161582 A1 | 6/2011 | Volobuev |
| 2011/0264854 A1 | 10/2011 | Ouchi |
| 2011/0271049 A1 | 11/2011 | Zimoto et al. |
| 2011/0286130 A1 | 11/2011 | Goldberg et al. |
| 2012/0011313 A1 | 1/2012 | Kopylovitz et al. |
| 2012/0023289 A1 | 1/2012 | Anderson et al. |
| 2012/0317354 A1 | 12/2012 | Yokota et al. |
| 2013/0290598 A1 | 10/2013 | Fiske et al. |
| 2013/0339635 A1* | 12/2013 | Amit ................ G06F 9/5061 711/154 |
| 2015/0120995 A1 | 4/2015 | Hasfar et al. |
| 2016/0216911 A1 | 7/2016 | Ford et al. |
| 2016/0239390 A1 | 8/2016 | Myers et al. |
| 2016/0246677 A1* | 8/2016 | Sangamkar ........ G06F 11/1076 |
| 2016/0328162 A1* | 11/2016 | Hayes ................ G06F 3/0619 |
| 2017/0038816 A1 | 2/2017 | Madsen et al. |
| 2017/0125051 A1 | 5/2017 | Yang |

OTHER PUBLICATIONS

Balakrishnan, et al., Pelican: A Building Block for Exascale Cold Data Storage, 11th USENIX Symposium on Operating Systems Design and Implementation, dated Oct. 6-8, 2014, Broomfield, CO, 16 pages.

* cited by examiner

US 10,289,326 B2

OPTIMIZED DATA LAYOUT FOR OBJECT STORE SYSTEM

FIELD OF THE INVENTION

The present disclosure relates to data layout for object store systems. In particular, the present disclosure relates to optimized data layout for erasure coded storage systems.

BACKGROUND

In storage systems using erasure coded data protection, data is randomly spread across storage devices, typically hard disk drives. An incoming file or object is broken up into a number of pieces, i.e. the spread, and the pieces are written to a random selection of storage devices in the storage system. Erasure coded storage systems have a property defining how many pieces of the file or object can be lost yet the system still able to reconstruct the file or object from the remaining pieces not lost. Randomly selecting storage devices for writes benefits performance, but prevents the storage system from being able to use device power savings features as the storage devices in the storage system must remain powered up to prevent the long latency required to get storage devices, which may be utilizing these power saving features, back on-line and serving data. Therefore, there is a need to maximize power savings thus reducing the total cost of ownership (TCO) of storage systems.

SUMMARY

Systems and methods for an optimized data layout in an erasure coded storage system are disclosed. The systems and methods for deterministic layout of storage devices in an erasure coded storage system introduced herein maximize the ability to save power, and thus reduce the total cost of ownership (TCO), while having a minimal impact on performance. For example, a system includes one of more processors and a memory storing instructions that cause the one or more processors to determine a number of storage devices to include in each of a plurality of read/write sets. The number of storage devices to include in each of the plurality of read/write sets may be determined based on an erasure code and the total number or storage devices in a storage subsystem. The read/write sets may be configured to store and access data in the storage subsystem. Each of the plurality of read/write sets may be configured based on the erasure code and the determined number of storage devices to include in each read/write set. For example, one of the read/write sets may be configured as a write set. The write set may be configured to receive a data object and store the data object. The remaining sets of the plurality of read/write sets not configured as a write set may be configured as read sets. The read sets may be configured to access data from the storage subsystem. Data may be accessed from the read sets based on the erasure code. Further, based on the erasure code, a first subset of the storage devices in each read set may be configured as an active read subset. The active read subset may be configured to store a first subset of pieces of a stored data object. The first subset of pieces may be used to restore the data object based on the erasure code. Similarly, a second subset of the storage devices in each read set may be configured as an inactive read subset. The inactive read subset of storage devices may be configured to store a second subset of pieces of the data object.

Other embodiments of one or more of these aspects include corresponding systems, apparatus, and computer programs, configured to perform the actions of the methods, encoded on computer storage devices. It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Systems and methods for determining and utilizing an optimized data layout in an erasure coded storage system are disclosed. While the systems and methods of the present disclosure are described in the context of a particular system architecture, it should be understood that the systems, methods and interfaces can be applied to other architectures and organizations of hardware.

Deterministic data layouts in erasure coded storage systems provide power savings in storage systems and thus reduce the total cost of ownership (TCO). The deterministic data layout implementation introduced herein provides the ability to save power in an erasure coded storage system by utilizing the power savings afforded by operating some storage devices according to the deterministic data layout in a low power mode, including a powered off or spun down mode and a reduced spin speed mode. The optimized data layout implementation introduced herein affords minimal impact to the performance of an erasure coded storage system through techniques that reduce latency in the event of storage device errors. Additionally, the techniques introduced herein offer reduced latency while maintaining a percentage of storage devices of the erasure coded storage system powered down for power savings.

Figure 1:
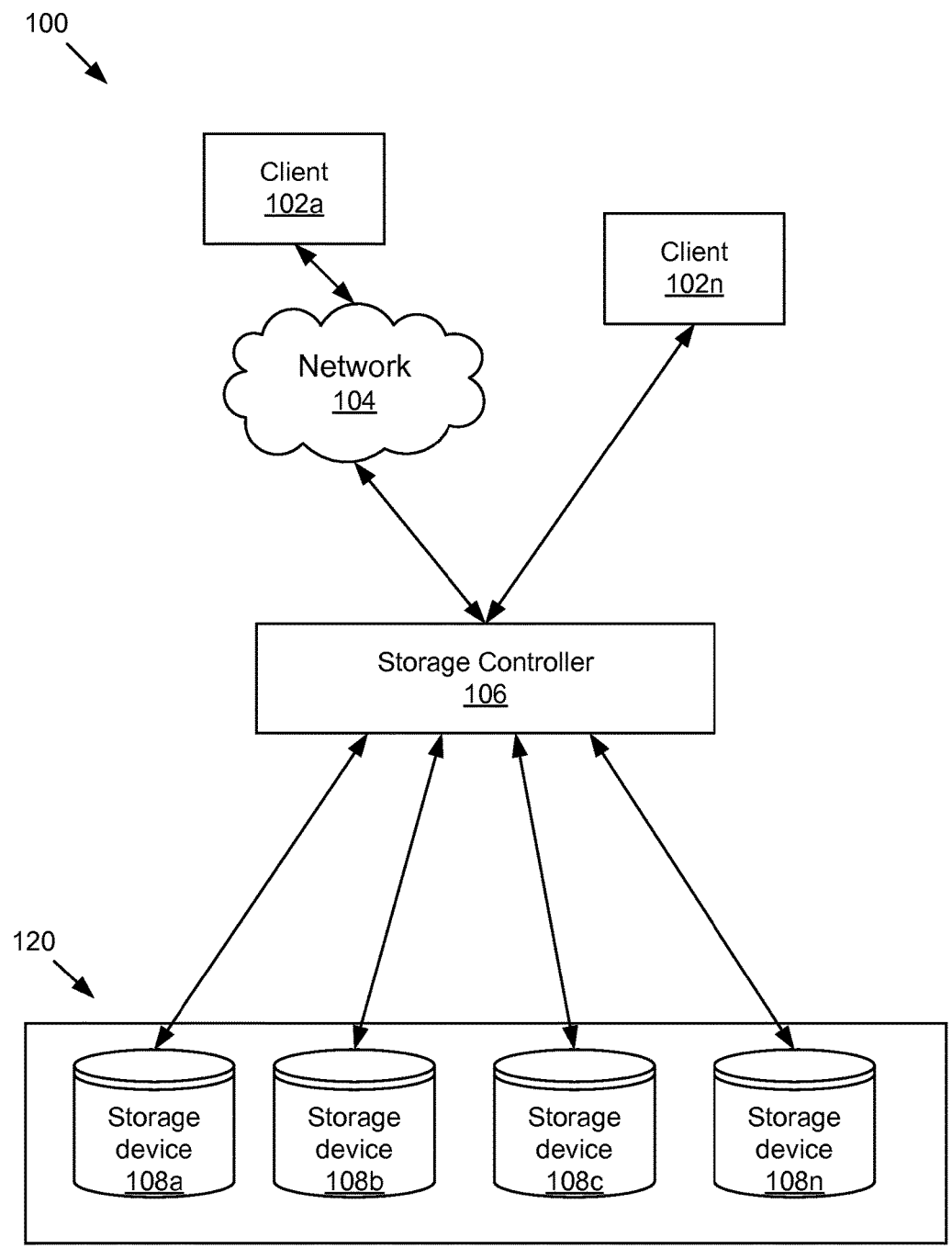
FIG. 1 is a high-level block diagram illustrating an example system including a storage controller and a storage subsystem.

FIG. 1 is a high-level block diagram illustrating an example system 100 including a storage controller 106 and a storage subsystem 120. The system 100 includes one or more client devices 102a ... 102n, a network 104, and a storage system including storage controller 106 and storage subsystem 120 including storage devices 108a ... n.

The client devices 102a ... 102n can be any computing device including one or more memory and one or more processors, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of making storage requests. A client device 102 may execute an application that makes storage requests (e.g., read, write, etc.) to the storage devices 108. While the example of FIG. 1 includes two client devices, 102a and 102n, it should be understood that any number of client devices 102a . . . 102n may be present in the system. Client device (e.g., client device 102a) may be directly coupled with storage sub-systems including individual storage devices (e.g., storage device 108a) via storage controller 106. Optionally, client devices 102 may be indirectly coupled with storage sub-systems including individual storage devices 108 via a separate controller.

In some embodiments, the system 100 includes a storage controller 106 that provides a single interface for the client devices 102 to access the storage devices 112 in the storage system. The storage controller 106 may be a computing device configured to make some or all of the storage space on disks 108 available to client devices 102. As depicted in the example system 100, client devices can be coupled to the storage controller 106 via network 104 (e.g., client device 102a) or directly (e.g., client device 102n).

The network 104 can be one of a conventional type, wired or wireless, and may have numerous different configurations including a star configuration, token ring configuration, or other configurations. Furthermore, the network 104 may include a local area network (LAN), a wide area network (WAN) (e.g., the internet), and/or other interconnected data paths across which multiple devices (e.g., storage controller 106, client device 102, etc.) may communicate. In some embodiments, the network 104 may be a peer-to-peer network. The network 104 may also be coupled with or include portions of a telecommunications network for sending data using a variety of different communication protocols. In some embodiments, the network 104 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 104, in practice one or more networks 104 can connect the entities of the system 100.

Figure 2:
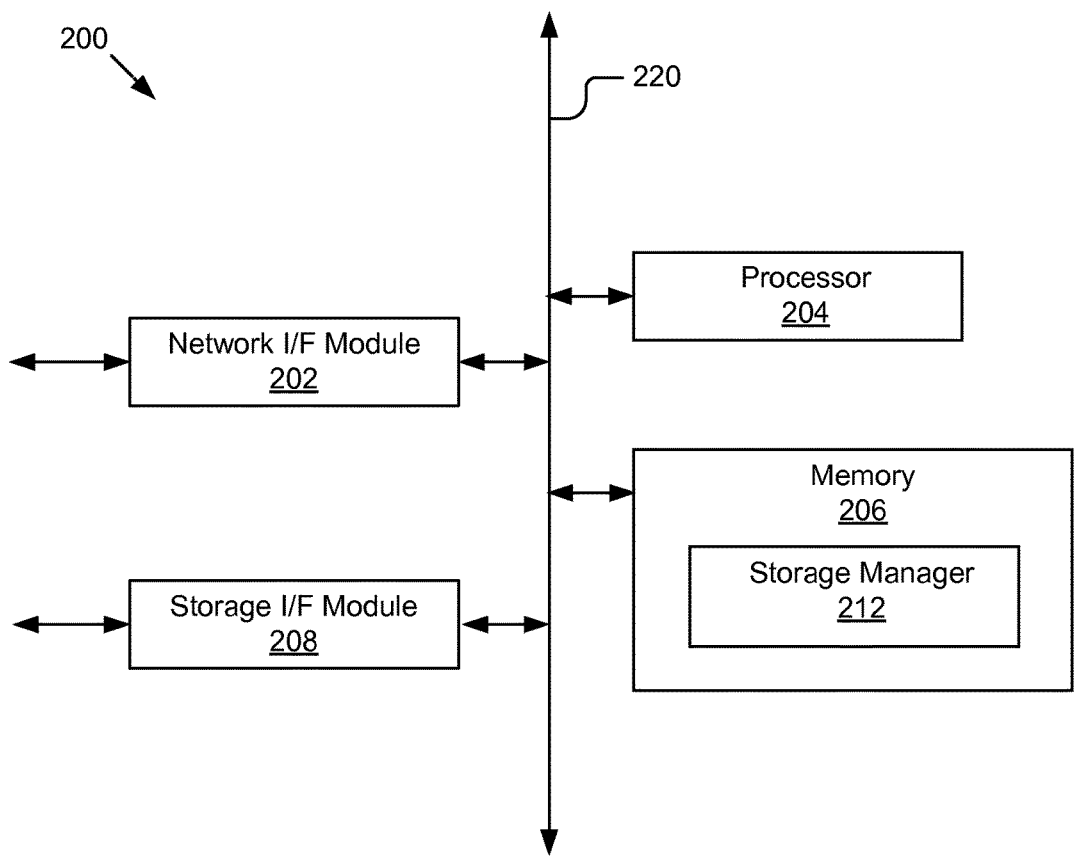
FIG. 2 is a block diagram illustrating an example system configured to implement the techniques introduced herein.

FIG. 2 is a block diagram illustrating an example system 200 configured to implement the techniques introduced herein. In one embodiment, the system 200 may be a client device 102. In other embodiments, the system 200 may be storage controller 106. In yet further embodiments, the system 200 may be implemented as a combination of a client device 102 and storage controller 106.

The system 200 includes a network interface (I/F) module 202, a processor 204, a memory 206 including storage manager 210, and a storage interface (I/F) module 208. The components of the system 200 are communicatively coupled to a bus or software communication mechanism 220 for communication with each other.

In some embodiments, software communication mechanism 220 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 220 can be implemented on any underlying hardware, for example, a network, the Internet, a bus, a combination thereof, etc.

The network interface (I/F) module 202 is configured to connect system 200 to a network and/or other system (e.g., network 104). For example, network interface module 202 may enable communication through one or more of the internet, cable networks, and wired networks. The network interface module 202 links the processor 204 to the network 104 that may in turn be coupled to other processing systems (e.g., storage controller 106 or client device 102). The network interface module 202 also provides other conventional connections to the network 104 for distribution and/or retrieval of files and/or media objects using standard network protocols such as TCP/IP, HTTP, HTTPS and SMTP as will be understood. In some embodiments, the network interface module 202 includes a transceiver for sending and receiving signals using WiFi, Bluetooth®, or cellular communications for wireless communication.

The processor 204 may include an arithmetic logic unit, a microprocessor, a general purpose controller or some other processor array to perform computations and provide electronic display signals to a display device. In some embodiments, the processor 204 is a hardware processor having one or more processing cores. The processor 204 is coupled to the bus 220 for communication with the other components of system 200. Processor 204 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 2, multiple processors and/or processing cores may be included. It should be understood that other processor configurations are possible.

The memory 206 stores instructions and/or data that may be executed by the processor 204. The memory 206 is coupled to the bus 220 for communication with the other components of the system 200. The instructions and/or data stored in the memory 206 may include code for performing any and/or all of the techniques described herein. The memory 206 may be, for example, non-transitory memory such as a dynamic random access memory (DRAM) device, a static random access memory (SRAM) device, flash memory or some other memory devices. In some embodiments, the memory 206 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

The storage interface (I/F) module 208 cooperates with storage manage 210 to access information requested by the clients 102. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks of hard disk drives 108. The storage I/F module 208 includes a plurality of ports having input/output (I/O) interface circuitry that couples with the disks 108 over an I/O interconnect arrangement.

The storage manager 210, stored on memory 206 and configured to be executed by processor 204, facilitates access to data stored on the storage devices 108 (e.g., hard disk drives). In certain embodiments, the storage manager 210 logically organizes data on the storage devices 108 (e.g., the data may be organized as a hierarchical structure of named directories and files on disks). In other embodiments, the storage manager 210 may detect a failure of a particular storage device 108 and may cooperate with one or more other components of system 200 (e.g., client device 102 or storage controller 106) to recreate the data stored on the failed storage device 108.

Figure 3:
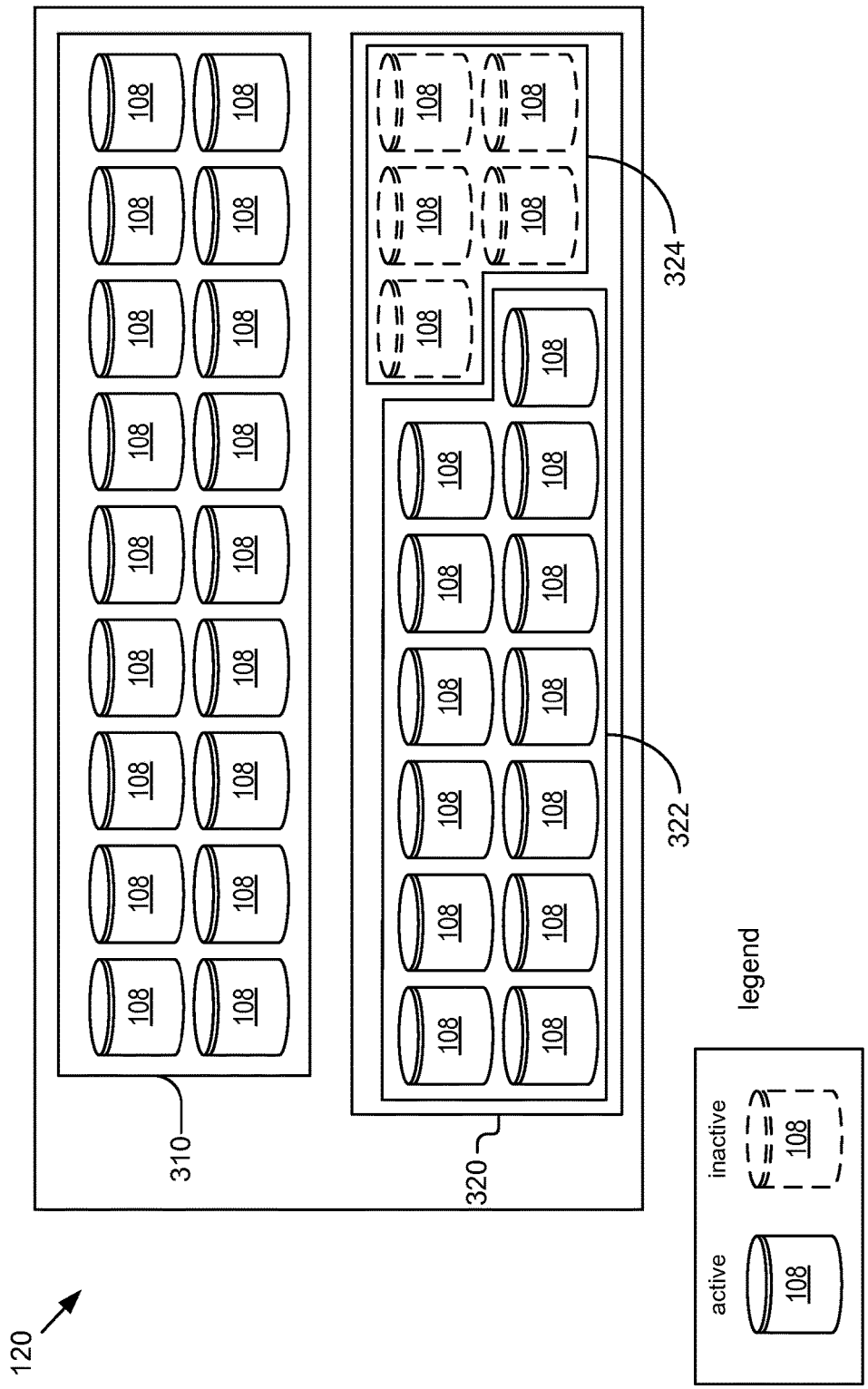
FIG. 3 is a block diagram illustrating an example storage subsystem, according to the techniques described herein.

FIG. 3 is a block diagram illustrating an example erasure coded storage subsystem 120 configured to implement the techniques described herein. In the example of FIG. 3, storage subsystem 120 includes sets of storage devices 108 herein described as read/write sets 310 and 320 to which read and write activity of the storage subsystem 120 is directed. In the illustrated example, storage subsystem 120 includes write set 310 and read set 320. FIG. 3 is intended for illustrative purposes to show the differences between read and write sets. In other embodiments, storage subsystem 120 may include one or more write sets 310 and a plurality of read sets 320. Write set 310 is configured to receive a data object and store the data object. For example, write set 310 includes groups of storage devices 108 to which all write activity of storage subsystem 120 is directed at an instance of time. In an example of an erasure coded storage subsystem 120 according to the techniques described herein, a data object is received into the storage subsystem 120 and split into a number of pieces according to an erasure code and then written across one or more vertical stripes of the storage devices in write set 310. In one embodiment, while write set 310 is designated as a write set for storing individual pieces of data objects, each of the storage devices in write set 310 operate in an active spun up mode. In the same or other embodiments, the individual pieces of a stored data object may be accessed from a write set.

According to some embodiments, the storage devices of storage subsystem 120 not included in write set 310, are included in one or more read sets 320. Read sets 320 are configured to access data from the storage subsystem 120 based on an erasure code. The erasure code may be any forward error correction code which transforms a data object of k symbols into a longer message (e.g., code word) with n symbols, such that the original data object can be recovered from a subset of the n symbols. The erasure code may be, for example, a parity code, Reed-Solomon (RS) code, Cauchy-RS code, Vandermonde-RS code, Erasure Resilient Systematic Code, or the like. For example, pieces of a data object are read from a number of storage devices in read set 320 according to an erasure code and the data object is restored from the pieces read from the number of storage devices. In one embodiment, read set 320 is configured to segregate the storage devices into subsets, for example, an active read subset 322 and an inactive read subset 324. The storage devices included in an active read subset 322 of read set 320 store a first subset of pieces of a stored data object sufficient to restore the data object. As illustrated in FIG. 3, storage devices in active read subset 322 operate in active mode, wherein the storage devices are completely or substantially spun up and operational. The storage devices included in inactive read subset 324 of read set 320 store a second subset of pieces of a stored data object. According to an embodiment, storage devices in inactive read subset 324 are inactive, wherein the inactive storage devices of inactive read subset 324 operate in a low power mode. Storage devices of inactive read subset 324 operate in low power mode and are configured in an inactive read state to save power in storage subsystem 120. Low power operation modes include, for example, spun down power mode and reduced spindle speed power mode.

In one embodiment, drives of the inactive read subset 324 may be transitioned from inactive to active for data recovery. As an illustration, each read/write set 310 and 320 in the example of FIG. 3 comprises eighteen storage devices according to an 18/5 erasure code. The active read subset 322 of read set 320 comprises thirteen storage devices according to the erasure code. The inactive read subset 324 of read set 320 comprises five storage devices. Data objects received by the storage system are broken up into eighteen pieces (or integer multiples of eighteen) and the eighteen pieces are written across the vertical stripes of the eighteen storage devices of a write set. In one embodiment, there may be a change over time in read/write set assignments to keep drives similarly full, wherein read set 320 becomes the write set 310 and write set 310 is transitioned to a read set 320 where the stored data object may be accessed. Similarly, the stored data object may be accessed from a write set 310.

According to the 18/5 erasure code in this example, only thirteen pieces of the data object spread across the thirteen storage devices of the active read subset 322 are needed to restore the data object. However, if there is a hard read error, or excessive latency, on one of the thirteen active storage devices of the active read subset 322, one or more storage devices of the inactive read subset 324 may be transitioned from the inactive read subset 324 to the active read subset 322. The failed drive may be replaced and/or repaired according to known techniques. In this example, if one of the storage devices of the active read subset 322 fails, one drive from the inactive read subset 324 may be spun up and transitioned to the active read subset 322. Therefore, the active read subset 322 maintains thirteen or more active drives in the active read subset at all times, and any remaining drives in the inactive read subset 324 operate in a low power savings mode.

Power savings may be accomplished in a number of ways according to the techniques introduced herein. In one embodiment, each storage device in an inactive read subset 324 may be spun down. According to this embodiment, if a storage device fails where, for example, there is a hard read error or excessive latency on one of the storage devices of an active read subset 322, one or more storage devices of the inactive read subset 324 may be spun up from the spun down power mode to an operational active mode and thus transition from the inactive read subset 324 to the active read subset 322. In another embodiment, a first subset of the storage devices in an inactive read subset 324 may be spun down and a second subset of the storage devices in the inactive read subset 324 may operate in a reduced spin speed power savings mode. According to this embodiment, if a storage device of the active read subset 322 fails, one or more storage devices of the second subset in the inactive read subset 324 may be spun up from the reduced spin speed mode. Improvements in latency incurred while spinning up drives from an inactive state may be accomplished by spinning up drives from a reduced spin speed mode rather than spinning up drives from a spun down mode.

Figure 4:
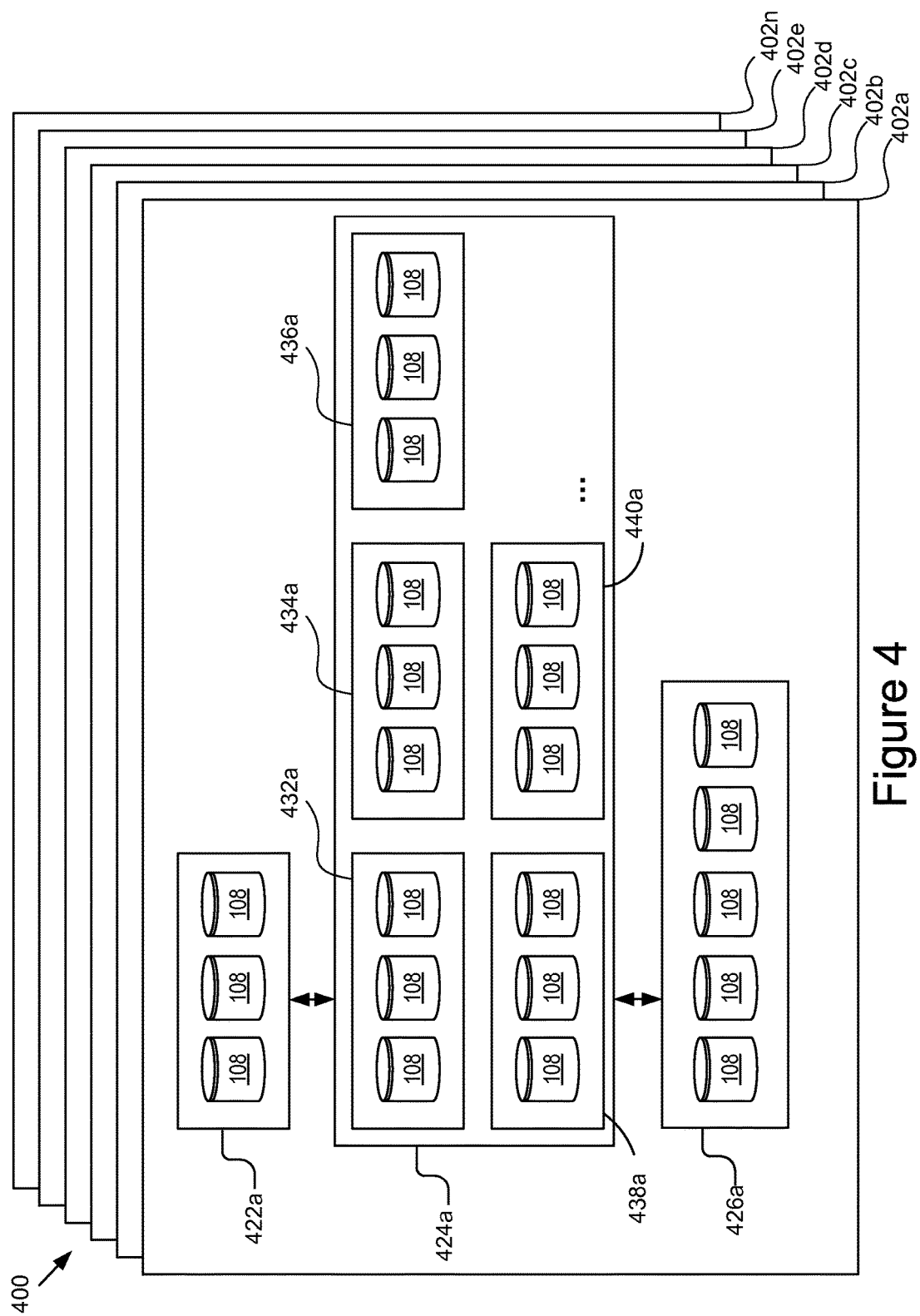
FIG. 4 is a block diagram illustrating an example storage subsystem layout, according to the techniques described herein.

FIG. 4 is a block diagram illustrating an example layout of storage subsystem 120. In the example of FIG. 4, storage subsystem 120 is depicted as single storage rack 400 containing a number of enclosures 402a, 402b, 402c, 402d, 402e, . . . 402n. Read/write sets may be split into groups of storage devices based on the number of enclosures in a rack.

These groups may be considered failure domains to minimize the chance of safety being violated or data loss in storage subsystem 120. In one embodiment, a storage subsystem 120 (e.g., rack 400) may have one active write set 422, the active write set 422 may be split into active write groups 422a . . . 422n. Each active write group 422a . . . 422n of active write set 422 may contain a subset of the storage devices in the write set 422 and each active write group 422a . . . 422n may be housed in a different enclosure 402a . . . 402n of rack 400. Further, in this embodiment, the storage subsystem 120 may have a plurality of read sets 424, each of the plurality of read sets 424 may be split into read groups. In this embodiment, a first read set 432 is split into read group 432a . . . 432n, a second read set 434 is split into read groups 434a . . . 434n, a third read set 436 is split into read groups 436a . . . 436n, and so forth. Each read group of each of the plurality of read sets 424 may contain a subset of the storage devices in each of the plurality of read sets of 424, respectively.

As illustrated in FIG. 4, each read group a . . . n of a read set 424 may be housed in a different enclosure 402a . . . 402n of rack 400. As illustrated in FIG. 4, read group 432a of a first read set 432 may be housed in enclosure 402a, read group 432b (not shown) of the first read set 432 may be housed in enclosure 402b, and so forth. Read groups 434a . . . 434n of a second read set 434, read groups 436a . . . 436n of a third read set 436, and so forth, may be housed accordingly in enclosures 402a-402n of rack 400. Additionally, in some embodiments, each enclosure 402a . . . 402n houses a group 426a . . . 426n of hot spares of storage subsystem 120. Hot spares are storage devices 108 that may be used to provide additional space needed to add storage capacity to a read or write group when capacity is missing, for example, due to a low capacity drive. Hot spares may also be used to rebuild and/or recreate data objects stored to a storage device of a read or write group if one of the storage devices of the read or write group fails. Therefore, in one embodiment, each enclosure 402a . . . 402n of rack 400 may contain a subset of the total number storage devices of storage subsystem 120 in each read/write set and a subset of the total number of storage devices as hot spares of the storage subsystem 120. As seen in FIG. 4, enclosure 402a of rack 400 houses: a subset of the storage devices in write set 422, e.g., write group 422a; a subset of the storage devices in each of a plurality of read sets 424, e.g., read groups 432a, 434a, 436a, 438a, 440a, etc.; and a group of hot spares, e.g., hot spares 426a.

As an illustration in the example of FIG. 4, using an 18/5 Erasure Code, a single rack 400, having a total of 588 storage devices 108 and six enclosures 402a . . . 402n (98 storage devices per enclosure), may contain 31 read/write sets of eighteen storage devices per set and thirty hot spares. Each read/write set will be split by the number of enclosures (e.g., where n=6) into groups of three storage devices per enclosure. The write set 422 may be split into six write groups 422a, 422b, 422c, 422d, 422e, and 422n. Write group 422a of write set 422 may be housed in enclosure 402a, write group 422b (not shown) of active write set 422 may be housed in enclosure 402b, and so forth. According to the 18/5 erasure code, a data object may be broken up into eighteen pieces (or integer multiples of eighteen) and those pieces may be written to a designated selection of three storage devices 108 per enclosure 402a . . . n, namely active write groups 422a . . . 422n of write set 422. Specifically, three pieces of the data object may be stored on the three storage devices of write group 422a, three pieces on write group 422b (not shown), and so forth.

Figure 5:
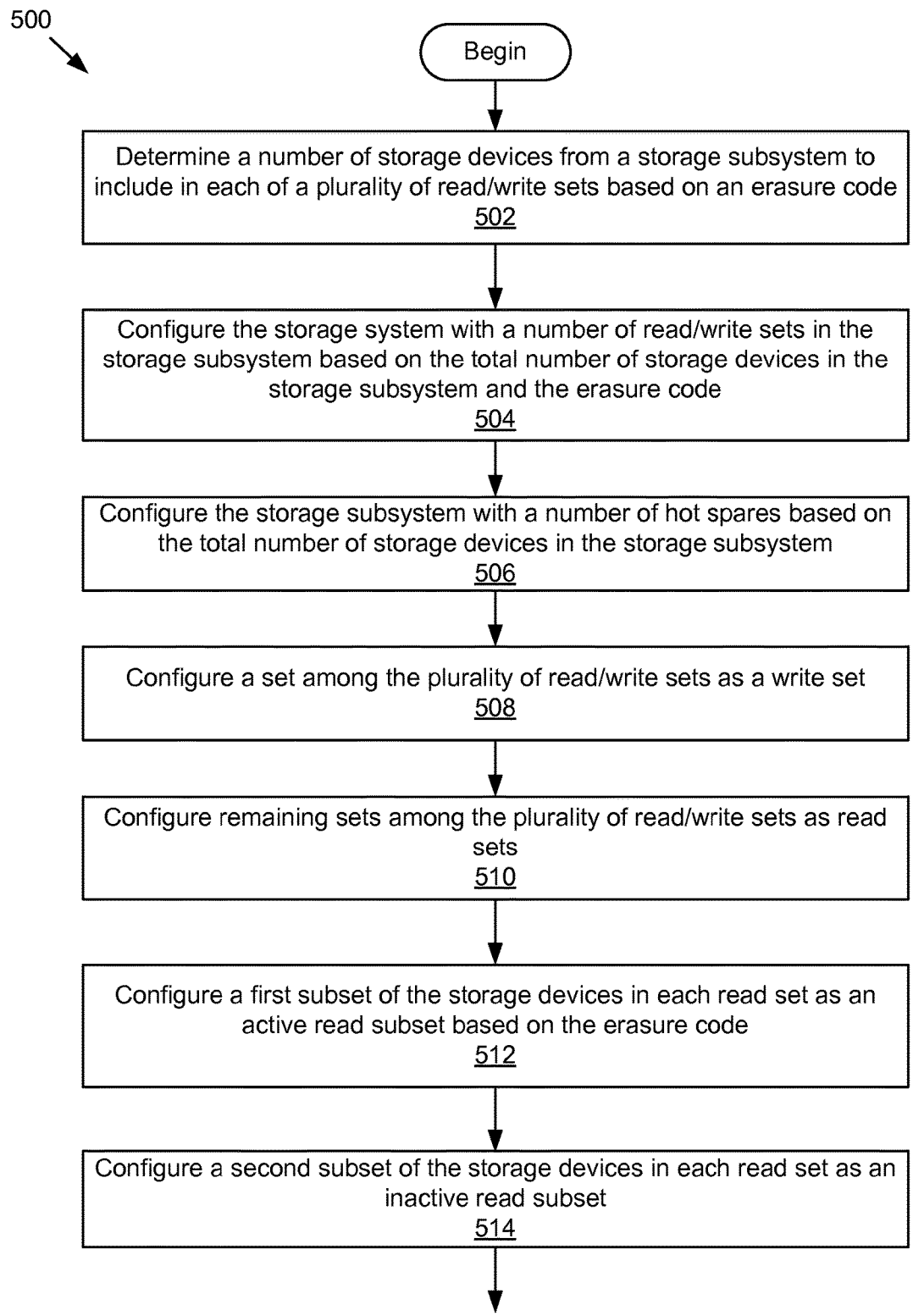
FIG. 5 is a flow chart of an example method for configuring a storage subsystem, according to the techniques described herein.

FIG. 5 is a flow chart of an example method 500 for configuring an erasure coded storage subsystem 120 according to a deterministic data layout introduced herein. At 502, the storage controller 106 determines a number of storage devices from a storage subsystem (e.g., storage subsystem 120) to include in each of a plurality of read/write sets (e.g., write set 310 and read sets 320) based on an erasure code and the total number of storage devices in the storage subsystem 120. For example, using an 18/5 Erasure Code and a storage subsystem 120 including a total of 588 storage devices (e.g., six enclosures each housing 98 storage devices), the storage controller 106 may determine at 502 that eighteen storage devices should be included in each read/write set. Based on the 18/5 erasure code, eighteen represents the spread, i.e. the number of pieces a data object may be broken up into. Further, based on the 18/5 erasure code, five is the safety, i.e. the number of pieces of the data object that can be lost with the system still able to reconstruct the data object from the remaining thirteen available pieces. Additionally, at 502, the storage controller 106 may determine, using the 18/5 Erasure Code, the storage subsystem 120 may have up to 32 read/write sets based on the total number of storage devices in the storage subsystem 120 and the determined number of storage devices to include in each read/write set. Alternatively, the storage subsystem 120 may determine the storage subsystem 120 should have up to 31 read/write sets so that an adequate number of hot spares (e.g., thirty hot spares) remain available to add additional capacity to the read/write sets or rebuild the data of a storage device of a read/write set.

At 504, the storage controller 106 configures each of the plurality of read/write sets in the storage subsystem (e.g., storage subsystem 120) based on the erasure code and the determined number of storage devices to include in each of the plurality of read/write sets. As an example, based on an 18/5 erasure code, the storage controller 106 may select a different set of eighteen drives to include in each of the plurality of read/write sets. In one embodiment, the eighteen drives selected may include three drives selected from each of six enclosures of a storage rack.

At 506, the storage controller 106 may configure a plurality of storage devices in the storage subsystem 120 as a plurality of hot spares based on the number of storage devices in the storage subsystem 120. The plurality of hot spares may be configured to act as additional storage space when a storage capacity of a storage device included in a read/write set is less than the storage capacities of other storage devices included in the read/write set. The plurality of hot spares may also be configured to provide an additional storage device to rebuild the data on a storage device of a read/write set when it is determined that the storage device of the read/write set has failed. For example, the storage controller 106 may determine, based on an 18/5 erasure code and a total of 31 read/writes sets included in the storage subsystem 120, that thirty is an adequate number of hot spares to include in the storage subsystem 120. In one embodiment, the storage controller 106 may designate a group of storage devices housed in each enclosure of a storage subsystem 120 to configure as hot spares. For example, in a storage rack housing six enclosures, the storage controller 106 may then designate and configure five storage devices per enclosure as hot spares (e.g., as depicted in the example of FIG. 4).

In some embodiments, if the storage controller 106 determines that the storage capacity of one storage device in a read/write group is less than the other storage devices, the storage controller 106 may configure the storage subsystem 120 to utilize storage space of one or more hot spares included in the storage subsystem 120 to add storage capacity to the storage device. For example, according to the layout of rack 400 of erasure coded storage subsystem 120, the storage space of a hot spare of group 426*a* housed in enclosure 402*a* may be used to provide additional storage capacity to a storage device of write group 422*a* of write set 310, if it is determined that the storage device of write group 422*a* has less storage capacity than the other storage devices of write group 422*a*.

The storage controller 106 may further identify a failed storage device in read set 320. If the storage controller 106 identifies a failed storage device, the storage controller 106 may use a hot spare in the storage subsystem 120 to rebuild the data of failed storage device of read set 320. For example, the storage controller 106 may determine data from a storage device 108 in read group 432*a* housed in enclosure 402*a* is irretrievable due to a drive failure. Responsive to this determination, the storage controller 106 may use a storage device 108 of hot spare group 426*a* of enclosure 402*a* to rebuild the data lost from the identified failed storage device of read group 432*a*.

One or more sets among a plurality of read/write sets may be configured by the storage controller 106, at 508, as a write set. The write set may be configured to receive a data object and store the data object. For example, according to an 18/5 erasure code, storage controller 106 may specify or assign eighteen storage devices (e.g., write set 310) of storage subsystem 120 to receive and store eighteen pieces (or integer multiples of eighteen) of a data object. Each of the eighteen pieces may be stored on a different storage device of the eighteen storage devices assigned to the write set. In one embodiment, only one write set may be configured at an instance of time. In another embodiment, a plurality of write sets may be configured at an instance of time. A write set may also be configured to access a requested data object stored to the write set. Further, assignment of read/write sets as a write set versus a read set may change over time to keep the usage of storage devices in the storage subsystem 120 uniform.

At 510, storage controller 106 may configure remaining sets among the plurality of read/write sets (e.g., those read/write sets that are not configured as a write set) as read sets. The read sets 320 may be configured to access requested data objects from the storage subsystem 120 based on an erasure code. According to an erasure code, a first subset of the storage devices in each read set may be configured, at 512, as an active read subset (e.g., active read subset 322). Each storage device in an active read subset 322 may be configured to operate in a fully operational power mode. Each active read subset 322 may be configured such that a data object may be retrieved using the subset of pieces of a stored data object stored on the storage devices in the active read subset 322. For example, based on an 18/5 erasure code, the storage controller 106 may specify thirteen storage devices of each read set to include in an active read subset 322 of read set 320 and operate in full power mode. Therefore, based on the 18/5 erasure code, a data object may be restored and/or reconstructed from thirteen pieces of the data object stored on the thirteen storage devices of the active read subset 322.

Storage controller 106 may configure, at 514, a second subset of the storage devices in each read set as an inactive read subset (e.g., inactive read subset 324), wherein each storage device in an inactive read subset 324 may be configured to operate in a low power mode. The low power mode may be a spun down power or powered off mode, or a reduced spindle or spin speed power mode. For example, a low power service level agreement (SLA) may be used by the system to define how to manage the storage devices of the inactive read subset 324. The storage devices in the inactive read subset 324 may be configured in various states of the low power mode to achieve power savings in the storage subsystem 120. In one embodiment, all of the storage devices in an inactive read subset 324 may be completely spun down. In another embodiment, all storage devices in an inactive read subset 324 may be in a near ready state, e.g., the storage devices may be in a reduced spin speed mode. In yet another embodiment to increase power savings in storage subsystem 120 while maintaining low read latency if a storage device in the active read subset fails, one storage device in an inactive read subset 324 may be configured in a near ready state while all other storage devices in the inactive read subset 324 may be configured in a spun down state.

Each inactive read subset 324 stores a second subset of pieces of a stored data object, such that the second subset of pieces of the stored data object are not used to restore and/or reconstruct the data object. As an example according to the techniques described herein, the first subset of pieces stored in the active read subset 322 are sufficient to restore and/or reconstruct the data object, while the second subset of pieces stored on the inactive read set, may be used as backup on failure of a storage device in the active read subset 322. Read performance or latency will not be affected, according to the techniques described herein. If a hard error occurs or there is excessive latency on a storage device of the active read subset 322, storage controller 106 may configure one or more storage devices of the inactive read subset 324 to transition from the inactive read subset 324 to the active read subset 322. As described above, storage controller 106 may configure one or more storage devices in inactive read subset 324 to operate in a near ready state to prevent long latencies to transition storage devices from an inactive read subset 324 to an active read subset 322.

Figure 6:
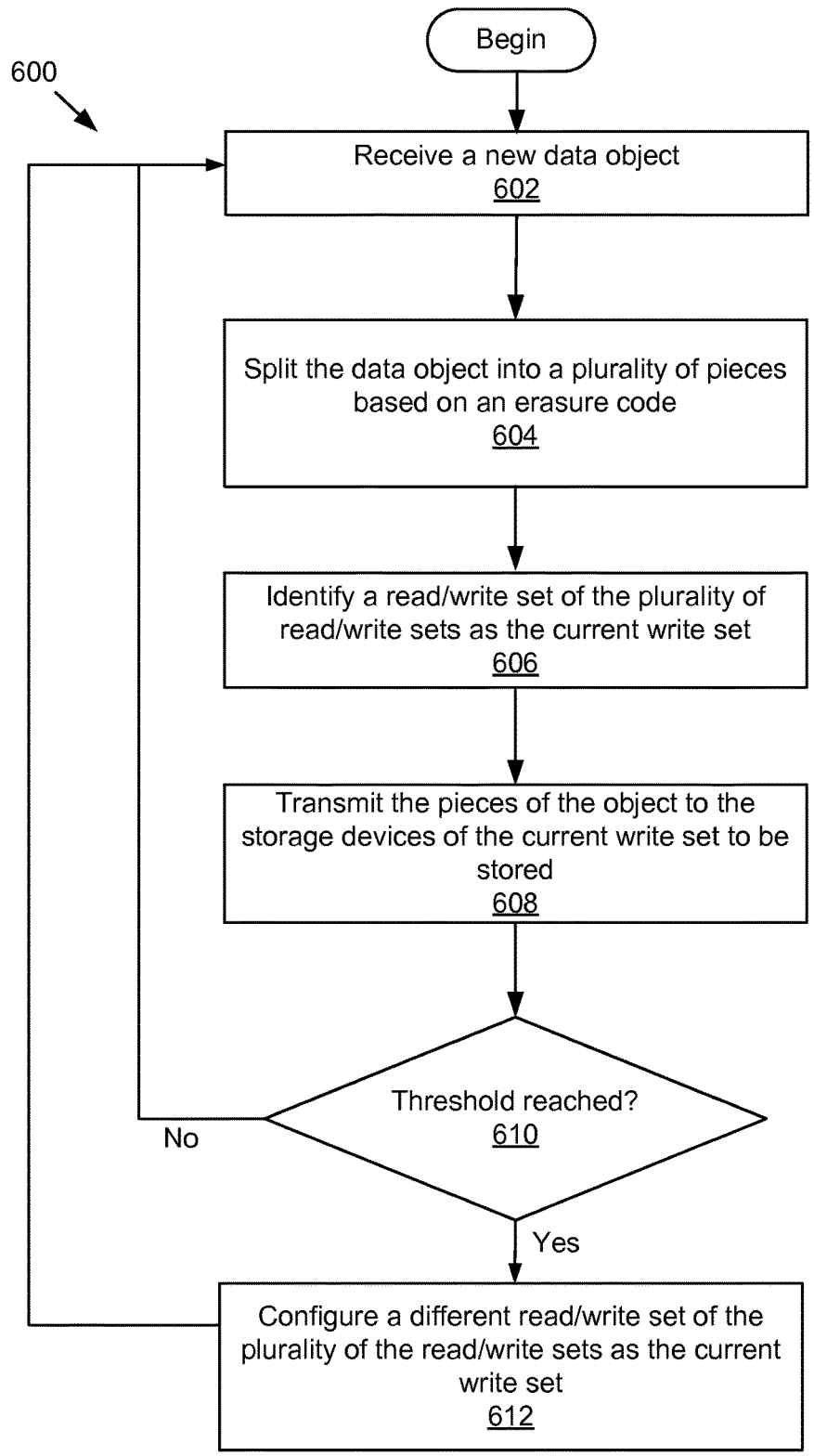
FIG. 6 is a flow chart of an example method for writing data objects to a storage subsystem, according to the techniques described herein.

FIG. 6 is a flow chart of an example method 600 for writing data to an erasure coded storage subsystem 120 according to a deterministic data layout introduced herein. At 602, a storage controller 106 receives a data object, e.g., from a client device 102. The data object is split by storage controller 106, at 604, into a plurality of pieces based on an erasure code. For example, based on an 18/5 erasure code, storage controller 106 may split the data object into eighteen pieces (or integer multiples of eighteen). At 606, storage controller 106 identifies a current write set among a plurality of read/write sets in storage system 120. For example, the storage controller 106 maintains a status of each read/write set of the plurality of read/write sets in the storage system 120 and identifies the current write set from the status. In another embodiment, if no write set has been established, the storage controller 106 may determine which read/write set of the plurality of read/write sets to designate as the current write set. For example, the storage controller 106 may determine which read/write set to designate as the current write set based on storage capacity of the storage devices in each read/write set, whether the read/write set has previously been a write set, and the like. At 608, storage controller 106 transmits the pieces of the data object to the storage devices 108 of the current write set 310 to be stored. For example, in an 18/5 erasure coded storage subsystem 120 as seen in FIG. 3, each of the eighteen pieces of the data object may be stored to a different storage device of the current write set 310. The 18/5 erasure coded storage subsystem 120 may include eighteen storage devices 108, as depicted in FIG. 3.

The storage controller 106 may further determine, at 610, whether a threshold has been reached related to the current write set 310. In one embodiment, the threshold may be a predetermined number of write operations to the current write set 310. For example, the storage controller 106 may determine a predetermined number of data objects have been stored to the current write set 310. In another embodiment, the threshold may be a capacity of storage of the storage devices in the current write set 310 that has been used. For example, storage controller 106 may determine the storage devices of the current write set 310 has reached a maximum capacity or a threshold capacity. In yet another embodiment, the threshold may be a predetermined amount of time elapsing since a first write operation to the current write set. If the storage controller 106 determines a threshold has been reached, the storage controller 106, at 612, may configure a different read/write set of the plurality of read/write sets of storage subsystem 120 as the current write set. To configure a different read/write set as the current write set, for example, the storage controller 106 may reconfigure one of a plurality of read sets 320 to be the current write set 310.

Further, if it is determined a threshold has been reached, the storage controller 106 may configure the current write set 310 as a read set 320. For example, the storage controller 106 may reconfigure the current write set 310 as a read set 320 by reconfiguring, based on the erasure code, the storage devices 108 of current write set 310 as an active read subset 322 of storage devices 108 and an inactive read subset of storage devices 108, according to techniques disclosed herein.

Figure 7:
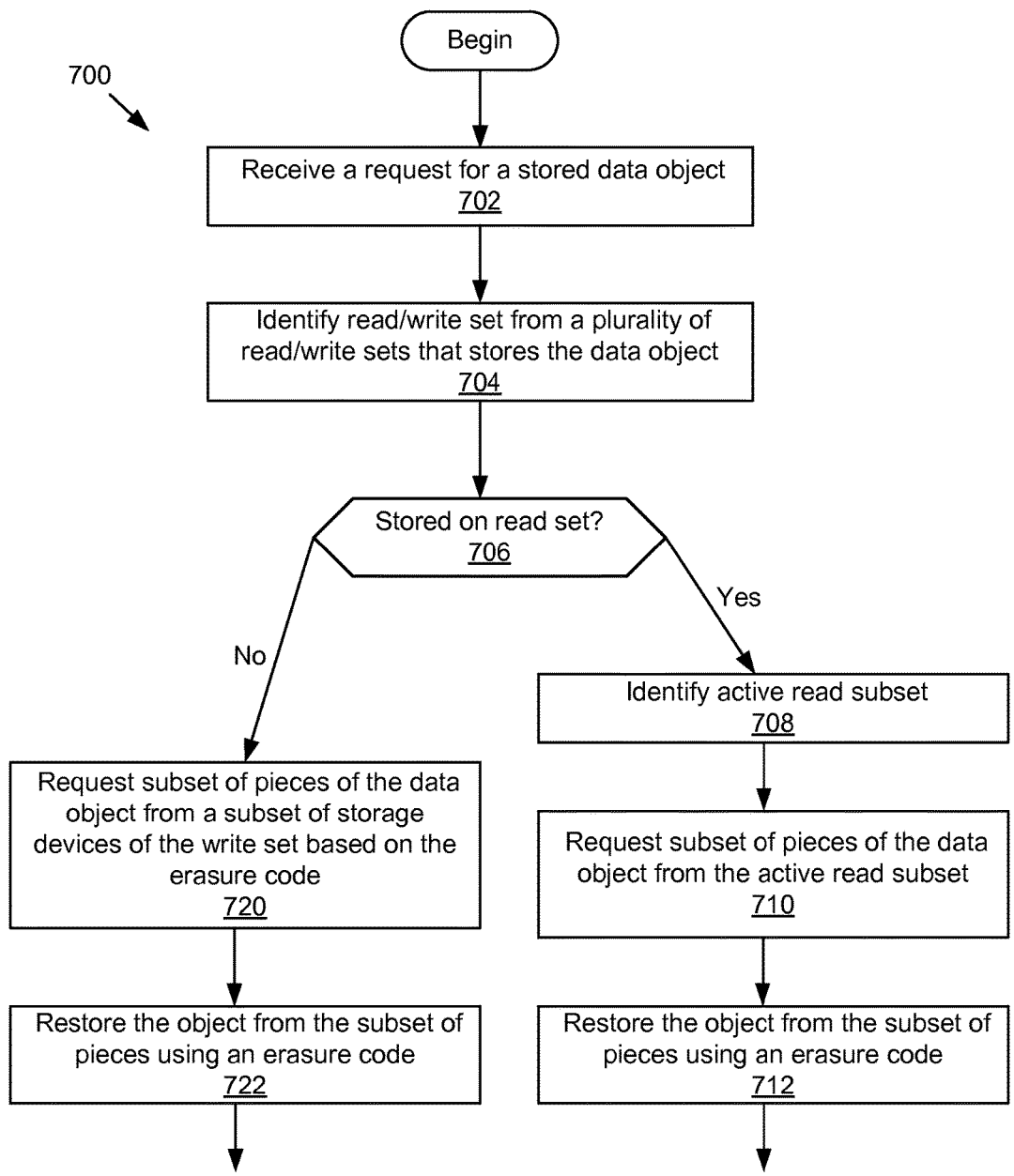
FIG. 7 is a flow chart of an example method for reading data objects from a storage subsystem, according to the techniques described herein.

A method 700 for reading or accessing data objects stored in erasure coded storage subsystem 120 is described in FIG. 7. At 702, storage controller 160 may receive a request for a data object stored in storage subsystem 120. The storage controller 106 may identify, at 704, the read/write set among the plurality of read/write sets of storage subsystem 120 which stores the data object. At 706, the storage controller 106 may determine whether the identified read/write set which stores the data object is a read set 320 or a write set 310. If it is determined the identified read/write set storing the data object is a read set, at 708, the storage controller 106 may identify an active read subset 322 storing a first subset of pieces of the stored data object. At 710, the storage controller 160 may request the pieces of the data object from the active read subset 322. The pieces of the data object from the active read subset 322 may be a subset of the total pieces of the data object stored to the read set 320. The storage controller 106 may, at 712, restore the data object from the pieces from the active read subset 322 using an erasure code. For example, the storage controller 106 may request the thirteen pieces of the data object stored on the thirteen storage devices 108 of the active read subset 322, and may restore and/or reconstruct the data object from the thirteen pieces based on an 18/5 erasure code. If the storage controller 106 determines, at 706, that the identified read/write set which stores the data object is a write set 310, the storage controller 106 may request at 720 any subset of pieces of the data object sufficient to restore the data object based on the erasure code and may restore and/or reconstruct the data object at 722 from the subset using the erasure code. For example, the storage controller 106 may request any thirteen pieces of the data object from any thirteen storage devices of write set 310 to restore the data object based on the erasure code. As each of the storage devices 108 of write set 310 remain active, the storage controller 106 does not need to distinguish between the storage devices of a write set and may select a storage device to request a piece of the data object based on any known storage access techniques.

Systems and methods for implementing an optimized data layout of an erasure coded storage system are described below. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some embodiments above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In some embodiments, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to embodiment in any specific programming language, or for any specific operating system or environment. Accordingly, the disclosure of the present techniques and technologies is intended to be illustrative, but not limiting.

What is claimed is:

1. A system comprising:
   a storage subsystem including a plurality of storage devices; and
   a storage controller coupled with the storage subsystem, the storage controller comprising a storage manager configured to:
      determine a number of storage devices from the storage subsystem to include in each of a plurality of read/write sets, wherein the number of storage devices to include in each of the plurality of read/write sets is equal to a number of pieces, based on an erasure code, that a data object is broken into for storage, the plurality of read/write sets configured to store and access data in the storage subsystem;
      determine a number of read/write sets based on a total number of storage devices in the storage subsystem;
      configure each of the plurality of read/write sets in the storage subsystem based on the erasure code and the total number of storage devices;
      configure a set among the plurality of read/write sets as a write set, the write set configured to receive a data object and store the data object;
      configure remaining sets among the plurality of read/write sets as read sets configured to access data from the storage subsystem based on the erasure code;
      determine, based on the number of storage devices to include in each of the plurality of read/write sets, which storage devices in each read set to include in an inactive read subset and to operate in a low power mode; and
      adjust the storage devices in each inactive read subset that operate in the low power mode based on a read latency while maintaining at least a minimum number of storage devices in each read set in an active read subset that operate in an active mode, wherein the minimum number is determined from the erasure code.

2. The system of claim 1, wherein to configure each read set the storage manager is further configured to:
   configure a first subset of the storage devices in each read set as the active read subset based on the erasure code, the active read subset configured to store a first subset of pieces of the data object usable to restore the data object based on the erasure code; and
   configure a second subset of the storage devices in the read set as the inactive read subset, the inactive read subset configured to store a second subset of pieces of the data object.

3. The system of claim 2, wherein to configure the inactive read subset, the storage manager is further configured to configure the storage devices in the inactive read subset to operate in the low power mode.

4. The system of claim 3, wherein the low power mode is a spun down power mode.

5. The system of claim 3, wherein the low power mode comprises a first set of the storage devices in the inactive read subset in a reduced spin speed power mode and a second set of the storage devices in the inactive read subset in a spun down mode.

6. The system of claim 1, wherein the storage manager is further configured to:
configure a set of storage devices in the storage subsystem as a plurality of hot spares based on the number of storage devices in the storage subsystem, wherein each of the plurality of hot spares is configured to:
act as additional storage space responsive to a storage capacity of a storage device included in a read/write set being less than storage capacities of other storage devices included in the read/write set; or
provide an additional storage device usable to rebuild a storage device of the read/write set responsive to a determination that the storage device of the read/write set has failed.

7. A computer-implemented method comprising:
receiving, by one or more processors, a data object;
splitting, by the one or more processors, the data object into a plurality of pieces based on an erasure code;
identifying, by the one or more processors, a read/write set of storage devices among a plurality of read/write sets as being a current write set, the current write set including a plurality of storage devices for storing the received data object in a storage subsystem, wherein a number of storage devices included in each of the plurality of read/write sets is equal to a number of pieces, based on the erasure code, that the data object is split into for storage;
transmitting, by the one or more processors, the plurality of pieces of the data object to the current write set to be stored, wherein each piece of the data object is stored to a different storage device of the current write set;
identifying one of the plurality of read/write sets as a read set;
determining, based on the number of storage devices to include in each of the plurality of read/write sets, which storage devices in the read set to include in an inactive read subset and to operate in a low power mode; and
adjusting the storage devices in the inactive read subset that operate in the low power mode based on a read latency while maintaining at least a minimum number of storage devices in the read set in an active read subset that operate in an active mode, wherein the first threshold minimum number is determined from the erasure code.

8. The method of claim 7, further comprising:
determining, by the one or more processors, whether a predetermined number of write operations to the current write set has occurred; and
responsive to determining that the predetermined number of write operations has occurred, configuring, by the one or more processors, a different read/write set of the plurality of read/write sets as the current write set.

9. The method of claim 7, further comprising:
determining, by the one or more processors, whether a threshold storage capacity of the storage devices in the current write set has been reached; and
responsive to determining that the threshold storage capacity has been reached, configuring, by the one or more processors, a different read/write set of the plurality of read/write sets as the current write set.

10. The method of claim 7, further comprising:
determining, by the one or more processors, whether a predetermined amount of time has elapsed since a first write operation to the current write set; and responsive to determining that the predetermined amount of time has elapsed, configuring, by the one or more processors, a different read/write set of the plurality of read/write sets as the current write set.

11. The method of claim 7, further comprising:
determining, by the one or more processors, whether predetermined amount of time has elapsed since a first write operation to the current write set; and
responsive to determining that the predetermined amount of time has elapsed, configuring, by the one or more processors, the current write set as the read set, the read set including the active read subset and the inactive read subset, the active read subset for storing a first subset of pieces of a stored data object usable to restore the data object based on the erasure code, and the inactive read subset for storing a second subset of pieces of the data object.

12. The method of claim 8, further comprising:
determining whether a storage capacity of a storage device included in the current write set is less than storage capacities of other storage devices included in the current write set; and
responsive to determining that the storage capacity of the storage device is less than storage capacities of other storage devices included in the current write set, utilizing, by the one or more processors, storage space of a hot spare included in the storage subsystem to add additional storage capacity to the storage device.

13. A computer-implemented method comprising:
receiving, by one or more processors, a request for a stored data object;
identifying, by the one or more processors, a read set of storage devices from a plurality of read sets in a storage subsystem, wherein the read set includes the stored data object, and a number of storage devices in the read set is equal to a number of pieces, based on an erasure code, that the data object is broken into for storage;
identifying, by the one or more processors, an active read subset of storage devices in the read set, the active read subset of storage devices storing a subset of pieces of the stored data object, wherein the subset of pieces includes sufficient data to restore the stored data object;
requesting, by the one or more processors, the subset of pieces of the data object from the active read subset;
restoring, by the one or more processors, the data object from the subset of pieces from the active read subset of storage devices using the erasure code;
determining, based on the number of storage devices of the read set, which storage devices in the read set to include in an inactive read subset and to operate in a low power mode; and
adjusting the storage devices in the inactive read subset that operate in the low power mode based on a read latency while maintaining at least a minimum number of storage devices in each read set in the active read subset that operate in an active mode, wherein the minimum number is determined from the erasure code.

14. The method of claim 13, further comprising:
determining, by the one or more processors, whether a storage device of the active read subset has failed;
responsive to determining that the storage device of the active read subset has failed, identifying, by the one or more processors, a storage device of the inactive read subset, wherein the storage devices of the inactive read subset operate in the low power mode; and
activating, by the one or more processors, the identified storage device of the inactive read subset.

15. The method of claim 14, wherein activating the identified storage device of the inactive read subset comprises spinning up the storage device from the low power mode.

16. The method of claim 15, wherein the low power mode is a spun down mode.

17. The method of claim 15, wherein the low power mode is a reduced spin speed power mode.

18. The method of claim 14, wherein activating the identified storage device of the inactive read subset comprises:
- selecting a storage device of the inactive read subset operating in a reduced spin speed mode; and
- spinning up the selected storage device to a fully operational power mode.

19. The method of claim 13, further comprising:
- identifying a failed storage device in the read set; and
- responsive to identifying the failed storage device, using a hot spare in the storage subsystem to rebuild the failed storage device.

20. A system comprising:
- means for receiving a data object;
- means for splitting the data object into a plurality of pieces based on an erasure code;
- means for identifying a read/write set of storage devices among a plurality of read/write sets as being a current write set, the current write set including a plurality of storage devices for storing the received data object in a storage subsystem, wherein a number of storage devices included in each of the plurality of read/write sets is equal to a number of pieces, based on the erasure code, that the data object is split into for storage;
- means for transmitting the plurality of pieces of the data object to the current write set to be stored, wherein each piece of the data object is stored to a different storage device of the current write set;
- means for identifying one of the plurality of read/write sets as a read set;
- means for determining, based on the number of storage devices to include in each of the plurality of read/write sets, which storage devices in the read set to include in an inactive read subset and to operate in a low power mode; and
- means for adjusting the storage devices in the inactive read subset that operate in the low power mode based on a read latency while maintaining at least a minimum number of storage devices in the read set in an active read subset that operate in an active mode, wherein the minimum number is determined from the erasure code.

* * * * *